United States Patent
Wang et al.

(10) Patent No.: US 11,071,055 B1
(45) Date of Patent: Jul. 20, 2021

(54) NETWORK SLICE SELECTION IN CELLULAR SYSTEM

(71) Applicant: NOKIA TECHNOLOGIES OY, Espoo (FI)

(72) Inventors: Zhi Wang, Qingdao (CN); Laurent Thiebaut, Antony (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/158,747

(22) Filed: Jan. 26, 2021

(30) Foreign Application Priority Data

Jan. 27, 2020 (FI) ...................... 20205079

(51) Int. Cl.
*H04W 48/18* (2009.01)
*H04W 48/14* (2009.01)
*H04W 48/16* (2009.01)
*H04W 28/02* (2009.01)

(52) U.S. Cl.
CPC ....... *H04W 48/18* (2013.01); *H04W 28/0268* (2013.01); *H04W 48/14* (2013.01); *H04W 48/16* (2013.01)

(58) Field of Classification Search
None
See application file for complete search history.

(56) References Cited

U.S. PATENT DOCUMENTS

| | | | | |
|---|---|---|---|---|
| 10,798,647 | B2 * | 10/2020 | Wang | H04W 76/11 |
| 2018/0317163 | A1 * | 11/2018 | Lee | H04W 48/18 |
| 2019/0281541 | A1 * | 9/2019 | Zhang | H04W 36/00 |

FOREIGN PATENT DOCUMENTS

| | | |
|---|---|---|
| CN | 108632945 A | 10/2018 |
| EP | 3343978 A1 | 7/2018 |
| EP | 3528519 A1 | 8/2019 |
| EP | 3550892 A1 | 10/2019 |
| WO | 2017143047 A1 | 8/2017 |

(Continued)

OTHER PUBLICATIONS

Office Action dated May 22, 2020 corresponding to Finnish Patent Application No. 20205079.

(Continued)

*Primary Examiner* — Hong S Cho
(74) *Attorney, Agent, or Firm* — Squire Patton Boggs (US) LLP

(57) ABSTRACT

This document discloses a solution for selecting a network slice for an application. According to an aspect, a method comprises as performed by a terminal device: triggering, by the terminal device, network slice selection in the terminal device for an application executed in the terminal device; transmitting, by the terminal device in response to said triggering, a network slice query request message to a network node of a network infrastructure; receiving, by the terminal device from the network node as a response to the network slice query request message, a network slice query response message indicating at least one network slice available to the terminal device and comprising at least one quality-of-service parameter of the at least one network slice; and selecting, by the terminal device, a network slice of the at least one network slice for the application on the basis of the at least one quality-of-service parameter.

17 Claims, 6 Drawing Sheets

(56) References Cited

FOREIGN PATENT DOCUMENTS

WO     WO 2019/005069 A1    1/2019
WO          2019243113 A1    12/2019

OTHER PUBLICATIONS

Finnish Search Report dated May 22, 2020 corresponding to Finnish Patent Application No. 20205079.
Communication of Acceptance under section 29a of Patents Decree dated Sep. 28, 2020 corresponding to Finnish Patent Application No. 20205079.
Extended European Search Report dated Jun. 8, 2021 corresponding to European Patent Application No. 21152510.0.

\* cited by examiner

NETWORK SLICE SELECTION IN CELLULAR SYSTEM

FIELD

Various embodiments described herein relate to the field of wireless communications and, particularly, to selecting a network slice for a terminal device in a cellular communication system.

BACKGROUND

Network slicing is a concept where network resources of an end-to-end connection between a user device and another end point in a public land mobile network (PLMN) are sliced. Similar network slicing may be employed in private networks. A network slice may be understood as a logical end-to-end network that can be dynamically created and/or modified. The network(s) between the end devices may all be sliced from one end device to the other end device, the slices thus forming logical pipelines within the network(s) using the same physical network infrastructure. User equipment (UE) may access a slice over a radio interface. Each pipeline/slice may serve a particular service type such as enhanced mobile broadband (eMBB), ultra-reliable low latency communications (URLLC), or massive Internet of Things (MIoT), for example. MIoT is in some literature called Massive Machine Type Communications (MMTC). Other slices and corresponding service types may be envisaged. Each service type may have distinct characteristics regarding a quality of service (QoS). For example, eMBB may support mechanisms for high bandwidth with moderate delays, URLLC may support mechanisms for low latencies and high reliability of data transfer, and MIoT may support low power consumption at the UE.

BRIEF DESCRIPTION

Some aspects of the invention are defined by the independent claims.

Some embodiments of the invention are defined in the dependent claims.

The embodiments and features, if any, described in this specification that do not fall under the scope of the independent claims are to be interpreted as examples useful for understanding various embodiments of the invention. Some aspects of the disclosure are defined by the independent claims.

According to an aspect, there is provided an apparatus for a terminal device, comprising means for performing: triggering network slice selection in the terminal device for an application executed in the terminal device; in response to said triggering, causing transmission of a network slice query request message to a network node of a network infrastructure; receiving, from the network node as a response to the network slice query request message, a network slice query response message indicating at least one network slice available to the terminal device and comprising at least one quality-of-service parameter of the at least one network slice; and selecting a network slice of the at least one network slice for the application on the basis of the at least one quality-of-service parameter.

In an embodiment, the means are configured to perform said selecting by at least transmitting to the network node a request to configure a routing policy for data of the application in the selected network slice.

In an embodiment, the request to configure the routing policy comprises at least one information element indicating an identity of the application.

In an embodiment, the network slice query request message comprises at least one information element specifying at least one criterion, and wherein the at least one network slice indicated by the network slice query response message meets the at least one criterion.

In an embodiment, the means are configured to perform said triggering as responsive to the application requesting for data transfer with determined quality-of-service constraints.

According to an aspect, there is provided an apparatus for a network node of a network infrastructure, comprising means for performing: receiving a network slice query request message from a terminal device requesting for information on available network slices; determining at least one network slice available to the terminal device; transmitting, to the terminal device as a response to the network slice query request message, a network slice query response message that indicates the at least one network slice available to the terminal device and that comprises at least one quality-of-service parameter of the at least one network slice; receiving, from the terminal device, a message indicating a selection of a network slice for an application executed in the terminal device; and configuring a routing policy for data of the application in the selected network slice in the network infrastructure.

In an embodiment, the message indicating the selection of the network slice comprises at least one information element indicating an identity of the application.

In an embodiment, the network slice query request message comprises at least one information element specifying at least one criterion, and wherein the at least one memory and computer program code configured to, with the at least one processor, cause the apparatus to include in the network slice query response message network slices that meet the at least one criterion and exclude from the network slice query response message at least one network slice not meeting the at least one criterion.

In an embodiment, the above-described means comprise at least one processor and at least one memory including computer program code, wherein the at least one memory and computer program code configured to, with the at least one processor, cause the performance of the apparatus.

According to an aspect, there is provided a method for a terminal device, comprising: triggering, by the terminal device, network slice selection in the terminal device for an application executed in the terminal device; transmitting, by the terminal device in response to said triggering, a network slice query request message to a network node of a network infrastructure; receiving, by the terminal device from the network node as a response to the network slice query request message, a network slice query response message indicating at least one network slice available to the terminal device and comprising at least one quality-of-service parameter of the at least one network slice; and selecting, by the terminal device, a network slice of the at least one network slice for the application on the basis of the at least one quality-of-service parameter.

In an embodiment, said selecting comprises transmitting to the network node a request to configure a routing policy for data of the application in the selected network slice.

In an embodiment, the request to configure the routing policy comprises at least one information element indicating an identity of the application.

According to an aspect, there is provided a method for a network node of a network infrastructure, comprising: receiving, by the network node, a network slice query request message from a terminal device requesting for information on available network slices; determining, by the network node, at least one network slice available to the terminal device; transmitting, by the network node to the terminal device as a response to the network slice query request message, a network slice query response message that indicates the at least one network slice available to the terminal device and that comprises at least one quality-of-service parameter of the at least one network slice; receiving, by the network node from the terminal device, a message indicating selection of a network slice for an application executed in the terminal device; and configuring, by the network node, a routing policy for data of the application in the selected network slice in the network infrastructure.

In an embodiment, the message indicating the selection of the network slice comprises at least one information element indicating an identity of the application.

In an embodiment, the network slice query request message comprises at least one information element specifying at least one criterion, the method further comprising including, by the network node in the network slice query response message, network slices that meet the at least one criterion and excluding, by the network node, from the network slice query response message at least one network slice not meeting the at least one criterion.

According to an aspect, there is provided a computer program product embodied on a computer-readable medium and comprising a computer program code readable by a computer, wherein the computer program code configures the computer to carry out a computer process comprising all the steps of any one of the above-described methods.

According to an aspect, there is provided a system comprising any one of the above-described apparatuses for the terminal device and any one of the above-described apparatuses for the network node.

LIST OF DRAWINGS

Embodiments are described below, by way of example only, with reference to the accompanying drawings, in which FIG. 1 illustrates a wireless communication scenario to which some embodiments of the invention may be applied;

DESCRIPTION OF EMBODIMENTS

The following embodiments are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. The embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireline or wireless local area network (e.g. WLAN or WiFi or BBF/Cable access), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
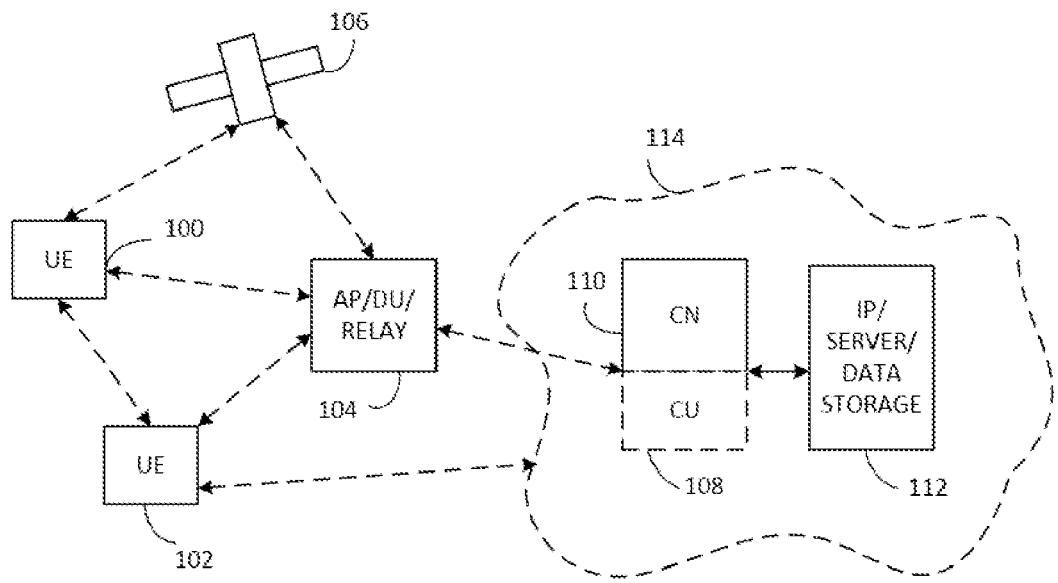

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network but the solution can apply to other types of access networks such as wireline or trusted/untrusted access to the cellular core network.

FIG. 1 shows devices 100 and 102. The devices 100 and 102 may, for example, be user devices. The devices 100 and 102 are configured to be in a wireless connection on one or more communication channels with a node 104. The node 104 is further connected to a core network 110. In one example, the node 104 may be an access node such as (e/g)NodeB providing or serving devices in a cell. In one example, the node 104 may be a non-3GPP access node. The physical link from a device to a (e/g)NodeB is called uplink or reverse link and the physical link from the (e/g)NodeB to the device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to devices. The antenna unit may comprise a plurality of antennas or antenna elements. The (e/g)NodeB is further connected to the core network 110 (CN or next generation core 5GC). Depending on the system, the counterpart on the CN side can be an AMF (Access and Mobility management Function), Session management Function (SMF) and Policy Control Function (PCF), for providing connectivity of devices (UEs) to external packet data networks, etc.

The device (also called user device, UE, user equipment, user terminal, terminal device, etc.) illustrates one type of an apparatus to which resources on the air interface are allocated and assigned, and thus any feature described herein with a device may be implemented with a corresponding apparatus, such as a relay node. An example of such a relay node is a layer 3 relay (self-backhauling relay) towards the base station.

The device typically refers to a device (e.g. a portable or non-portable computing device) that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a device may also be a nearly exclusive uplink only device, of which an example is a camera or video camera loading images or video clips to a network. A device may also be a device having capability to operate in Internet of Things (IoT) network which is a scenario in which objects are provided with the ability to transfer data over a network without requiring human-to-human or human-to-computer interaction, e.g. to be used in smart power grids and connected vehicles. The device may also utilise cloud. In some applications, a device may comprise a user portable device with radio parts (such as a watch, earphones or eyeglasses) and the computation is carried out in the cloud. The device (or in some embodiments a layer 3 relay node) is configured to perform one or more of user equipment functionalities. The device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz—cmWave, below 6 GHz—cmWave—mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

The technology of Edge cloud may be brought into a radio access network (RAN) by utilizing network function virtualization (NFV) and software defined networking (SDN). Using the technology of edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Network slicing described briefly in Background allows a network operator to provide dedicated virtual networks over a common network infrastructure. The different virtual or logical networks may be designed to provide different networking characteristics such as different qualities of service (QoS) including the QoS at signalling level (e.g. service resiliency, dimensioning, location of the network functions). For example, the virtual networks may be customized to meet specific needs of various applications, services, devices, customers and/or operators. Network slicing thus enables support for numerous and varied services envisaged in 5G, for example.

In a system employing the network slicing, e.g. the system of FIG. 1, a single physical network or a group of networks is sliced into multiple virtual networks (slices) that can support different radio access networks (RANs) or different service types running across a single RAN. The network slicing may be used to partition a core network of a cellular communication system such as a 5G system, but it may also be implemented in the RAN such as the WLAN or cellular RAN.

Each network slice may be optimized to provide resources and network topology for the specific service and traffic that will use the slice. Network resources may be allocated according to requirements in terms of mobility, capacity, connectivity and coverage such that particular demands of each use case will be met. Physical network components or resources may be shared across different network slices.

Each network slice may be isolated from other network slices so that no network slice interferes with the traffic in another network slice. Each network slice may be configured with its own network architecture, engineering mechanism and network provisioning. The network slice typically contains management capabilities, which may be controlled by the network operator or the customer, depending on the use case. The network slice may be independently managed and orchestrated. The user experience of the network slice will be the same as if it was a physically separate network.

For example, an autonomous car will rely on V2X (vehicle-to-anything) communication which requires low latency but not necessarily a high throughput. The URLLC network slice described in Background may provide a suitable networking service. A streaming service consumed while the car is in motion will require a high throughput and is susceptible to latency. The eMBB network slice described in Background may provide a suitable networking service for such an application. Both networking services can be delivered over the same common physical network(s) on different virtual network slices.

Each virtual network (network slice) comprises a unique identifier. 3GPP specifications define Single Network Slice Selection Assistance Information (S-NSSAI) and Network Slice Selection Assistance Information (NSSAI i.e. a collection of S-NSSAI) for such a purpose. A device may readily have NSSAI values and application mappings that link applications to the network slices. The NSSAI values may be provided by a cellular communication system, or the NSSAI values may exist in a subscriber identification module (SIM) or equivalent identity card of the device 100. Slice identification may also take other form than 3GPP NSSAI.

Figure 2A:
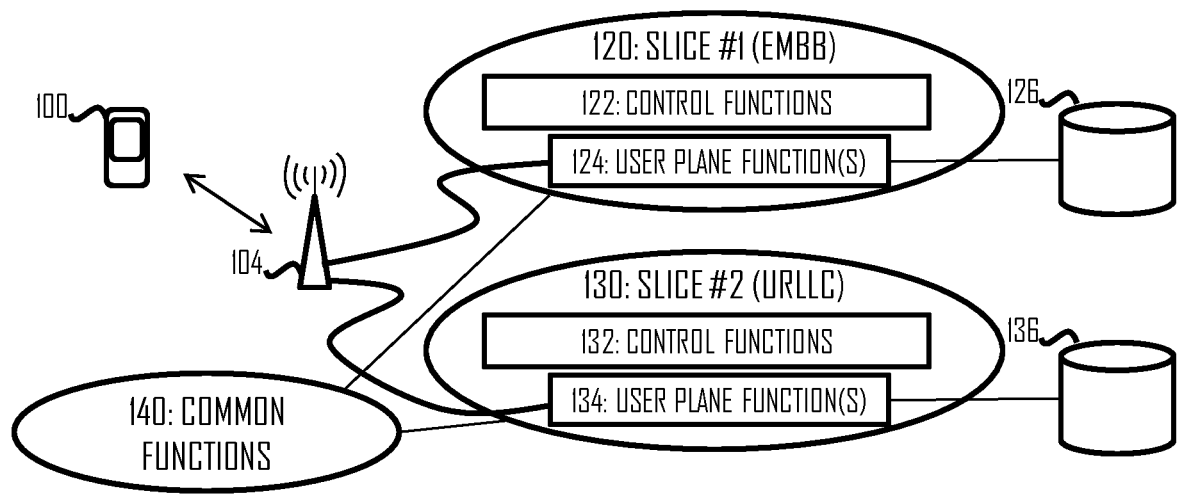
FIGS. 2A and 2B illustrate utilization of network slices in a network infrastructure.

FIG. 2A illustrates an embodiment of the network slicing. The access node 104 may provide access to one or more sliced networks illustrated by the network slices 120, 130. The network slice 120 may be established to an end device 126 that may be a network element of a PLMN, a network element of a private network, or a server or a similar device in a public network such as the Internet. The end device may be a network element of a core network of a cellular communication system such as a 5G system, or a network residing on top of the core network. In a similar manner, the network slice 130 may be established to an end device 136 that may be a network element of the PLMN or a private network. The end devices 126, 136 may be different network elements, and they may belong to the same network or different networks. The slices may employ at least partially the same physical network components and have unique slice identifiers, e.g. unique NSSAIs. Each network slice 120, 130 may comprise control functions 122, 132 that control the functions of the network slices. Examples of the control functions may include a session management function (SMF), a policy control function (PCF), and a network function repository function (NRF). SMF manages data sessions, PCF manages roaming and mobility and routing policies within the network slice, and NRF maintains a network function profile of the network slice and supports the discovery of the network slice. Each network slice may also comprise user plane function(s) 124, 134 that handle data transfer through the respective network slice. Additionally, there may be network functions 140 that are common to multiple network slices 120, 130. Such common functions 140 may include, for example, a network slice detection function (NSSF) and/or an access and mobility management function (AMF). Network slice instance selection for the terminal device 100 may be triggered as a part of a registration procedure by the AMF that receives the registration request from the terminal device 100. The AMF retrieves the slices that are allowed by user subscription and interacts with the selection of the network slice(s) for the terminal device 100, e.g. as in the embodiments described below.

Figure 2B:
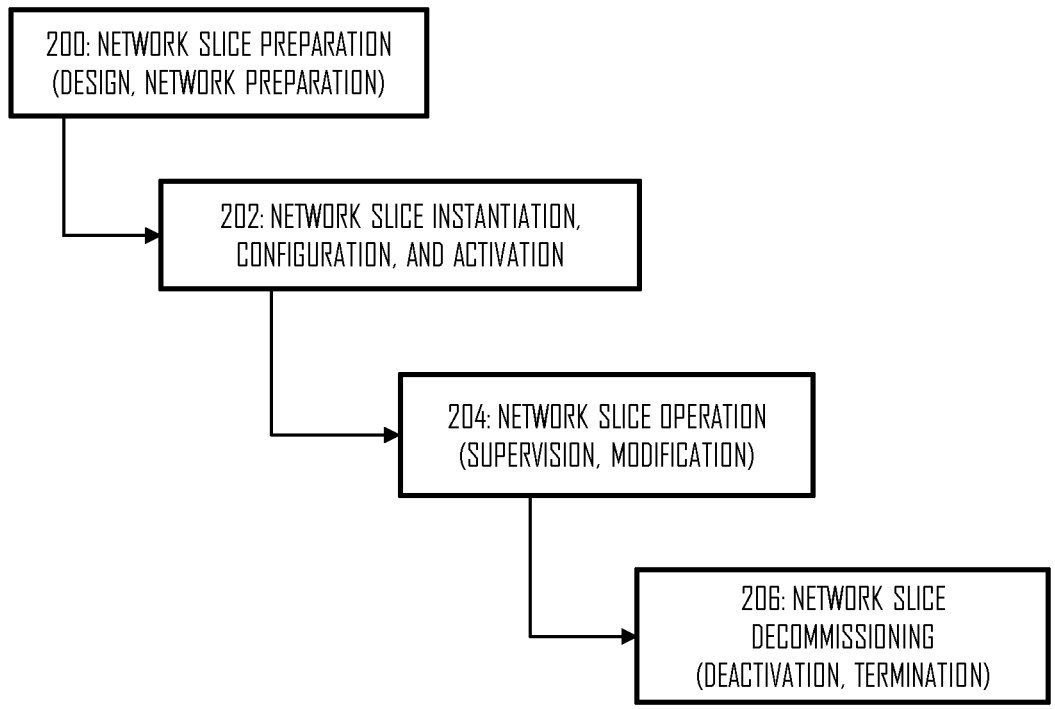

3GPP specifications describe network slice instance lifecycle management as depicted in FIG. 2B. A network slice is first designed in a preparation phase 200. Then, it is instantiated in step 202, comprising an instantiation phase, a configuration phase, and an activation phase. Then, the network slice is operational in step 204 where the network slice may be monitored and, if deemed necessary, modified. Finally, the network slice may be decommissioned (step 206) when the network slice is no longer needed. Accordingly, the network slices may be dynamically generated, modified, and terminated, as deemed beneficial for the system.

Conventionally, the network slice selection policies for the terminal device are determined in a network node of the network infrastructure, e.g. by the PCF in the core network. Current policies rely on the PCF sending rules (e.g. an UE route selection policy (URSP) as defined in 3GPP specifications) to the UE where the rules map an application identifier or a target destination, e.g. an internet protocol (IP) address range, for application traffic towards a slice that is to be selected by the UE for the corresponding traffic. However, there are numerous different applications running in the various terminal devices, and provision of such information in the network infrastructure may be complicated. This is complicated because it requires the operator to be aware of all applications that get proposed in the application store and be aware of the requirements of such applications. Most applications can easily use a baseline (default) slice for eMBB but some may have specific requirements that the operator is not aware of. This is why it has been recognized by the authors of this paper that the network slice may need to be selected on the basis of requirements provided by the UE, e.g. in terms of quality-of-service (QoS) requirements. The QoS requirements are specified by a type of data that is supposed to be delivered, and the type of data is associated with an application that needs the data delivery. For example, a data streaming application (e.g. video application) will set different QoS requirements than an e-mail application, and an IoT sensor may set different QoS requirements than a V2X application. The QoS requirements may be accurate or less accurate in view of the true operation of the application and, therefore, it may be beneficial to have more detailed information on the application available.

Figure 3:
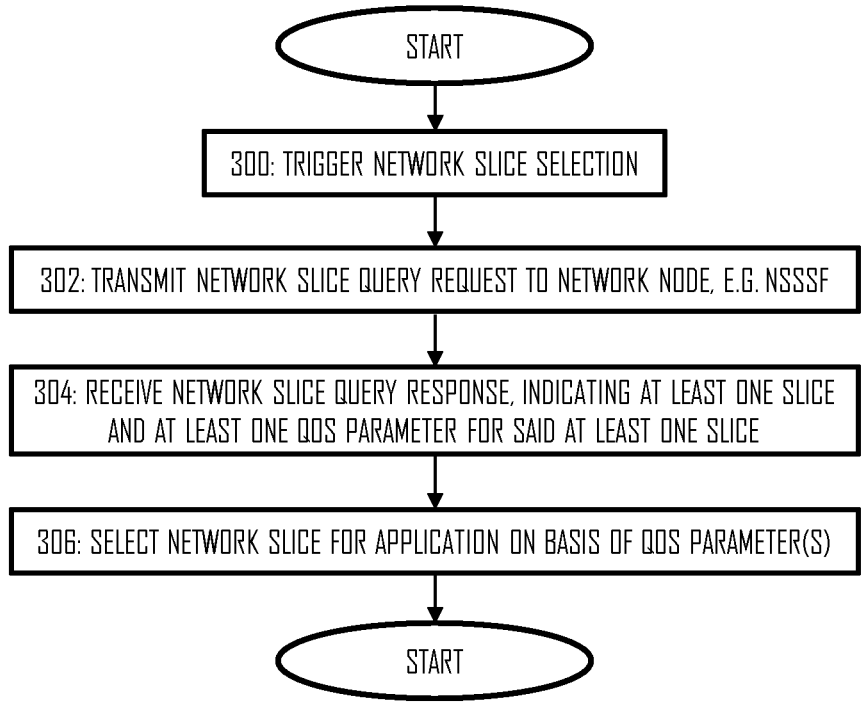
FIGS. 3 and 4 illustrate processes for performing network slice selection for an application executed in a terminal device according to some embodiments.
Figure 4:
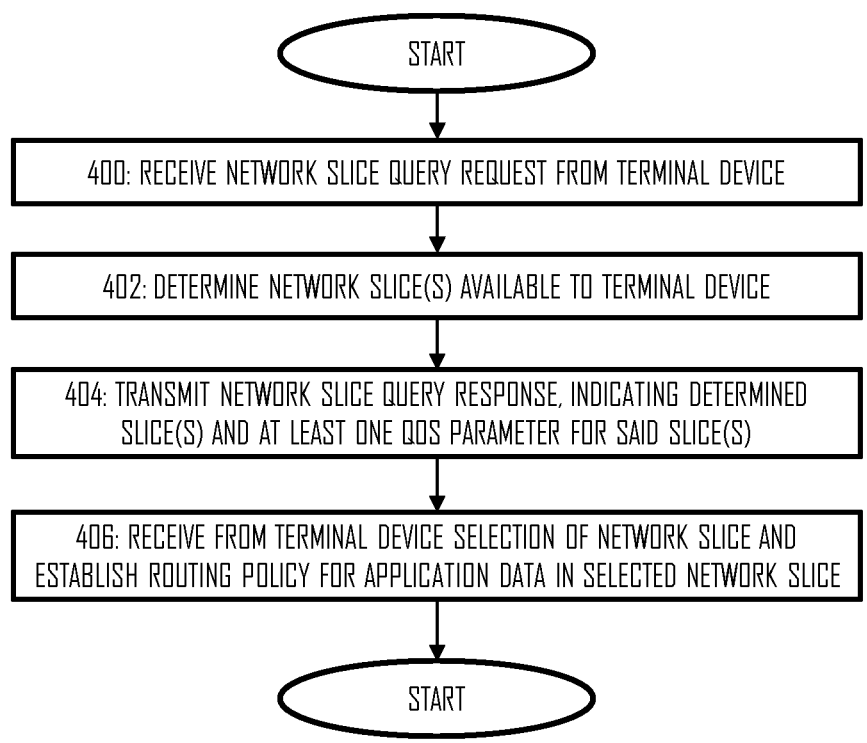

FIGS. 3 and 4 illustrate processes for performing the network slice selection according to some embodiments. Referring to FIG. 3, a process executed in the terminal device comprises: triggering (block 300) network slice selection in the terminal device for an application executed in the terminal device; in response to said triggering, transmitting (block 302) a network slice query request message to a network node of a network infrastructure; receiving (block 304), from the network node as a response to the network slice query request message, a network slice query response message indicating at least one network slice available to the terminal device and comprising at least one quality-of-service parameter of the at least one network slice; selecting (block 306) a network slice of the at least one network slice for the application on the basis of the at least one quality-of-service parameter.

Referring to FIG. 4, the process executed in the network comprises: receiving (block 400) the network slice query request message from the terminal device requesting for information on available network slices; determining (block 402) at least one network slice available to the terminal device; transmitting (block 402), to the terminal device as a response to the network slice query request message, the network slice query response message indicating the at least one network slice available to the terminal device and comprising at least one quality-of-service parameter of the at least one network slice; receiving (block 406), from the terminal device, a message indicating selection of a network slice for an application executed in the terminal device; and configuring (block 406) a routing policy data of the application in the selected network slice in the cellular network infrastructure.

Block 406 may include establishment of the routing policy or update of an existing routing policy for the terminal device or for the application.

Implementing the network slice selection for an application in the terminal device improves the slice selection by better adaptation between the slice capabilities and the characteristics of the application. The terminal device may take into account information that is not conventionally available to the PCF, such as detailed characteristics of the data transfer for the application. For example, the QoS requirements sent to the PCF define the requirements on a general level in terms of reliability, throughput, latency etc. Data traffic pattern of applications may be highly variable between various applications and operators may not be aware of all applications and such information cannot be taken into account in the conventional solutions.

Figure 5:
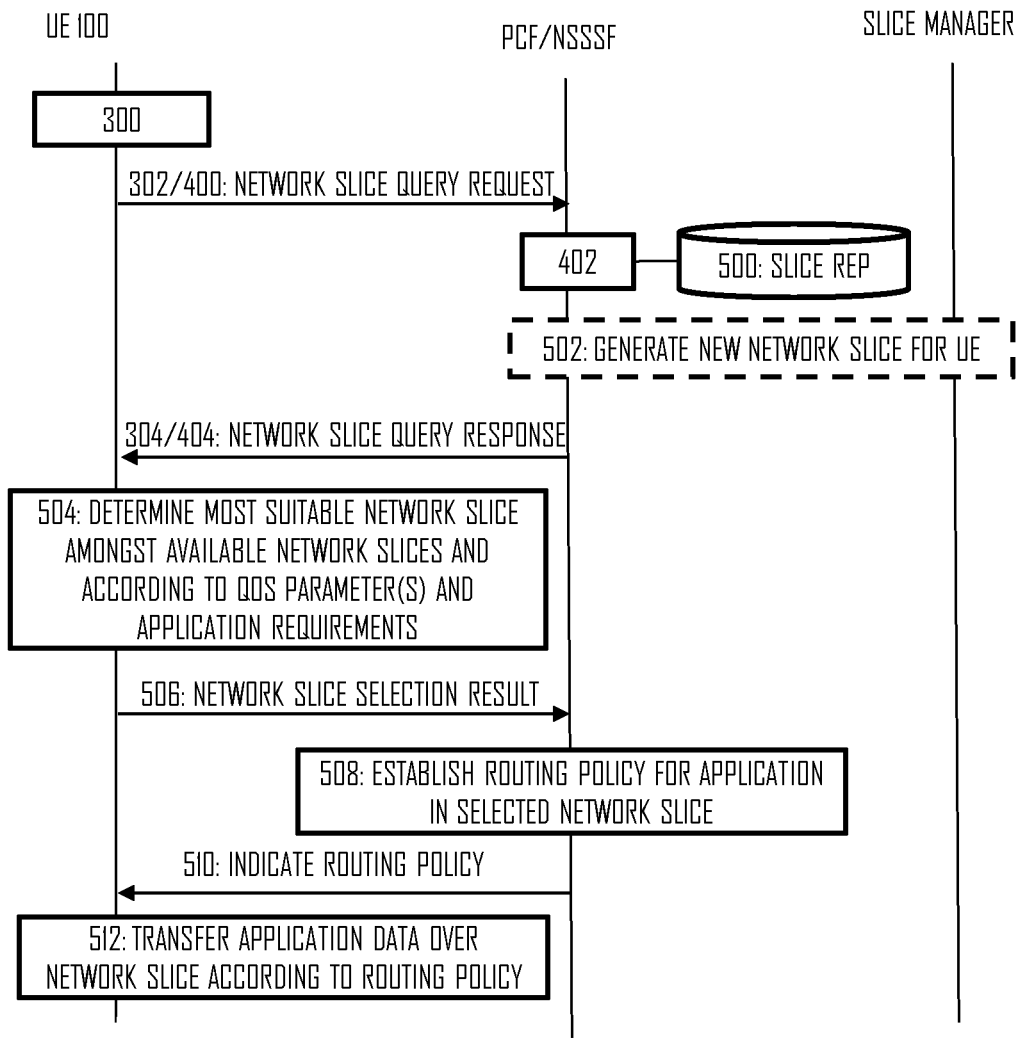
FIG. 5 illustrates a signalling diagram according to an embodiment combining the processes of FIGS. 3 and 4.

FIG. 5 illustrates a signalling diagram of an embodiment that combines the processes of FIGS. 3 and 4. Referring to FIG. 5, the procedure may start with block 300 that may be triggered upon launching or installing the application in the terminal device, upon reception of a new data transfer service request from a running application, or upon the terminal device entering a new service area through mobility. The request from the application may define determined quality-of-service constraints required by the application. The application may specify QoS requirements for the data transfer service. A slice selection manager in the terminal device may the evaluate the QoS requirements in view of the current data routing policy or policies established for one or more other applications in the terminal device. If the slice selection manager finds that one or more currently used network slices meets the QoS requirements, the terminal device may select one of the network slices and the procedure of FIG. 5 may move directly to existing 3GPP R16 mechanisms. If a suitable network slice cannot be found amongst the currently used network slices, the procedure may proceed to steps 302 and 400 where the terminal device requests the network node to provide the information on the network slices currently available to the terminal device.

In an embodiment, the network slice query request transferred in steps 302 and 400 comprises at least one information element indicating an identity of the application.

In an embodiment, the network slice query request comprises at least one information element specifying at least one criterion, e.g. a QoS requirement. The QoS requirement may comprise at least one of the following required of the network slice for the application: minimum throughput, minimum latency, minimum reliability, and charging information.

In an embodiment, the network node is the PCF and step 302 and 304 may be carried via non-access stratum (NAS), e.g. via the AMF.

In an embodiment, the network node is a network slice selection support function comprised in the PCF or in another element of the network, e.g. the core network.

A network slice repository 500 may store information on currently active network slices and information on access permissions. The repository may be stored in an unified data repository (UDR) of the 5G network, for example. In step 402, the network node may access the slice repository 500 to acquire information on those one or more network slices that meet the at least one criterion specified in the network slice query request and/or to which the terminal device has access permissions (user subscription data). If no such network slice is currently operational, block 502 may be executed where the network node issues a network slice preparation and instantiation request to a slice manager, e.g. a management and orchestration function (MANO). Accordingly, blocks 200 and 202 may be executed in block 502.

Upon acquiring information on the one or more network slices suitable for the terminal device, the network node adds the information on the network slice(s) to the network slice query response, and the response is delivered to the terminal device in steps 304 and 404. The response may include identifiers of each network slice comprised in the response. Each identifier of a network slice may be a single network slice selection assistance information (S-NSSAI). The response may comprise QoS parameters of the available network slices, e.g. any one of the parameters corresponding to the at least one criterion provided in the network slice query request: throughput, latency, reliability, and charging information. The parameters may be provided in terms of guaranteed performance of each network slice. In other words, the response may indicate for each available network slice a guaranteed throughput, guaranteed (maximum) latency, guaranteed (minimum) reliability, etc.

In block 504, the terminal device then selects one of the network slices indicated in the response received in step 304. In the selection, the terminal device may use the parameters of the network slices provided in the response and, additionally, requirements defined by the application. Table 1 illustrates an example of requirements that may be defined by the application:

TABLE 1

| Application Identifier | Traffic identifier | Network Slice Requirement | Remark |
|---|---|---|---|
| App #1 | Augmented/Virtual Reality Traffic | Throughput: >20 Mbps Latency: <50 ms | Minimum requirements |

TABLE 1-continued

| Application Identifier | Traffic identifier | Network Slice Requirement | Remark |
|---|---|---|---|
| | | Throughput: >50 Mbps Latency: <20 ms Reliability: Medium | Preferred requirements |
| | | Throughput: 100 Mbps Latency: <10 ms Reliability: High | High Quality |
| | Payment Traffic | Reliability: High Latency: <1000 ms Throughput: >1 Mbps | Minimum requirements |
| | | Reliability: Very High Latency: <1000 ms Throughput: >1 Mbps | Preferred requirements |

As described above, an advantage of the invention is that more information on the requirements or preferences of the applications may be taken into account. QoS requirements typically specify only minimum requirements for the data transfer and, therefore, the selection performed in the network may not reach the full potential in the selection.

Table 1 shows one example of an application requirement profile. This profile may be provided by the application to define its specific requirements of the network slice. At least one network slice requirement may be provided in the profile. To improve the selection, multiple network slice requirements may be provided, for different service levels, e.g. the minimum service level, preferred service level, high quality level as in Table 1. Since there may be different traffic types used by an application, the group of network slice requirements can also be set base on specific traffic type instead of application type, as illustrated in Table 1.

Block 504 may comprise searching the available network slices to find a network slice that can provide a service level as high as possible. For example, block 504 may first comprise checking for a network slice that provides the highest requirements. If such is found, then that network slice is selected, e.g. to meet the high-quality requirements of the application. Then, the application will get the best benefit of the data transfer. If such a network slice cannot be found, then the lower (preferred) requirements are cross-referenced with the parameters of the available network slices. Accordingly, the most suitable network slice available for the application will be selected in block 504.

If there are other criteria for the network slice selection on terminal device, such as the highest acceptable charging rate, block 504 may take such criteria into account as well. Based on the application requirements, block 504 may select a network slice that can provide a service level as high as possible with the condition of meeting all local provisioning thresholds such as the maximum charging rate. This is further refined in connection with FIG. 6.

Upon selecting the network slice for the application, the terminal device may transmit to the network node a request to configure a routing policy for data of the application in the selected network slice (step 506). The request may comprise at least one information element indicating an identity of the application and, in some embodiments, selected network slice information. Upon receiving the request, the network node may establish/update a routing policy for the application in the selected network slice (block 508). The routing policy may be established in accordance with UE route selection policy (URSP) as defined in 3$^{rd}$ Generation Partnership Project (3GPP) specifications for 5G. Upon establishing/updating the routing policy for the application in the selected network slice, the network node may respond to the terminal device in step 510 and indicate completion of the routing policy. Step 510 may follow the PCF downloading the routing policy to the terminal device, e.g. via an USRP provisioning interface of the 3GPP specifications for 5G. Once the routing policy is received by the terminal device in step 510, the terminal device may verify the routing policy and start transfer of application data over the network slice according to the routing policy (block 512).

In an embodiment, the terminal device indicates in step 506 information on the application, e.g. the above-described QoS parameters of the application. The network node may use this information when establishing/updating the routing policy.

Figure 6:
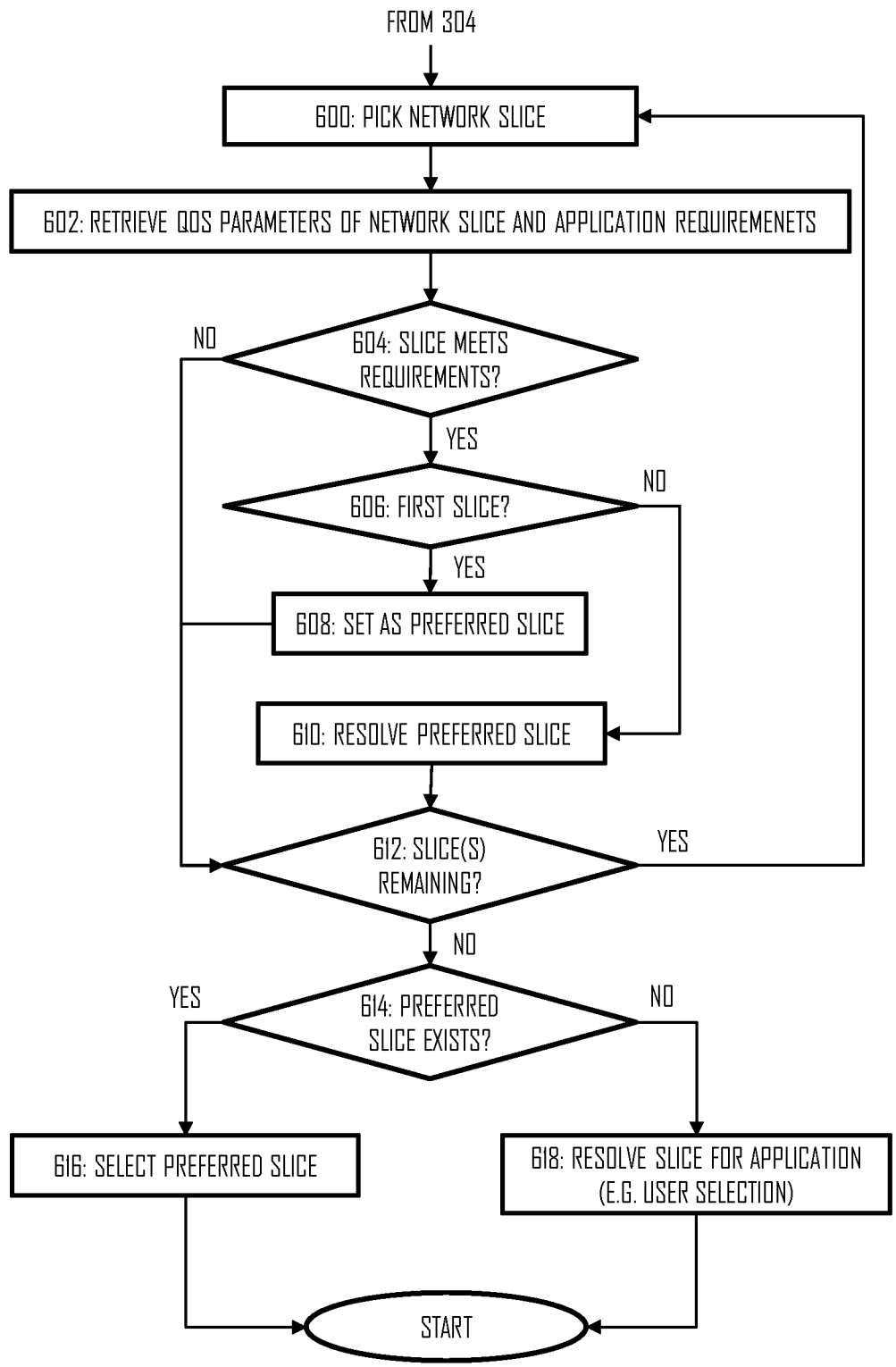
FIG. 6 illustrates an embodiment of a network slice selection process in the terminal device.

FIG. 6 illustrates an embodiment of the slice selection process (block 306 or 504) in the terminal device. Referring to FIG. 6, the process may start in block 600 where one of the network slices available to the terminal device is selected. In block 602, the QoS parameters of the picked network slice are retrieved as well as the application requirements, e.g. the requirements set out in Table 1. In block 604, the QoS parameters are compared with the application requirements. If the QoS parameters of the network slice meet the application requirements, the process proceeds to block 606. Otherwise, the process terminates for the picked network slice and proceeds to block 612.

In block 606, it is determined whether or not the slice is the first slice that meets the application requirements. If yes, the slice is stored as a preferred slice in block 608. Otherwise, the slices that meet the application requirements are compared in block 610 and one that can better meet the application requirements is selected as the preferred slice in block 610. For example, if a first slice is capable of meeting the minimum requirements of the application while a second slice is capable of meeting the preferred requirements of the application, the second slice is preferred over the first slice because of the capability of meeting the higher preferences of the application. From blocks 608 and 610, the process may proceed to block 612. In block 612, it is determined whether there are one or more slices that have not yet been considered. If yes, the process proceeds to block 600 where another slice that has not yet been picked will be picked. If all the available network slices have been considered, the process proceeds to block 614.

In block 614, it is determined whether or not the preferred slice has been stored, i.e. whether or not block 608 has been executed. If yes, the current preferred slice is selected in block 616. If no preferred slice meeting the application requirements has not been discovered amongst the network slices currently available to the terminal device, the process proceeds to block 618.

In block 618, it is resolved whether or not a slice can be provided to the application. If a slice reported by the network to the UE as a candidate for selection has been associated by the network with an indication that this slice has not (yet) been subscribed by the user, block 618 may comprise outputting a notification to a user of the terminal device via a user interface. The notification may inform the user of the situation of not finding a network slice (or connection) that would meet all the specifications and request the user to confirm whether or not the slice not currently subscribed to may be selected. Based on the user positive input, the process proceeds to the web page provided by the network in step 304/404 and, if the following subscription succeeds on the web page, proceeds to select the corresponding network slice. Otherwise, if the user input indicates decline to subscribe to the new slice, or the subscription process fails, etc. . . . , the terminal device may consider this slice is not suitable for selection.

In an embodiment, the network node may in block 402 determine also network slices to which the terminal device currently has no permissions and provide such network slices in the response (step 404) as well. Such network slices may be associated with an information element serving as an indicator of the lacking access permissions. In such an embodiment, block 306 or 618 may comprise proposing such a network slice to the user via the user interface in a situation where no network slice meeting the application requirements can be found amongst the network slices to which there are valid access permissions. The user may then select whether or not(s)he wishes to update the access permissions. If the user approves the update, the user may be directed to a procedure where the access permissions are controlled, e.g. via a uniform resource locator (URL). The URL may be provided by the network node in step 404 in a case where the response includes at least one network slice to which the terminal device has no access permissions currently. When the user has updated the access permissions by managing his/her subscription, a new set of one or more network slices becomes available to the terminal device, and a network slice meeting the application requirements may be accessible to the terminal device and selected for the application.

Figure 7:
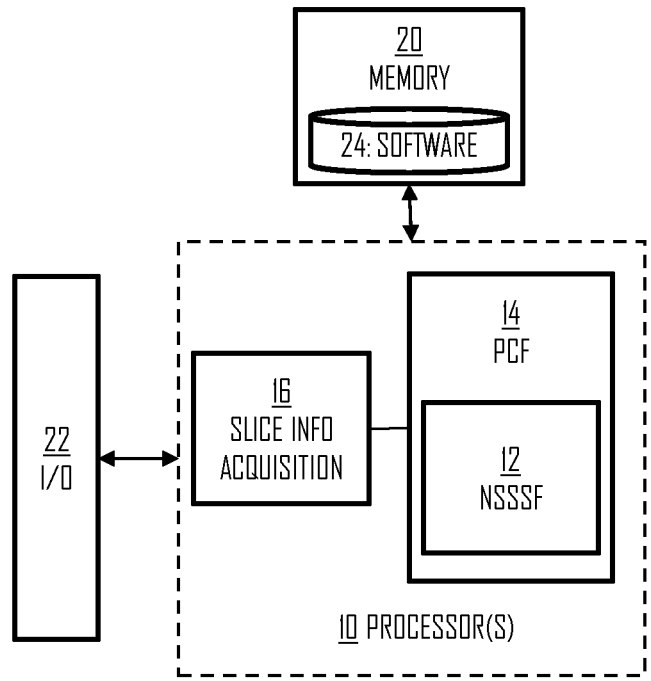
FIGS. 7 and 8 illustrate block diagrams of structures of apparatuses according to some embodiments of the invention.

FIG. 7 illustrates an embodiment of a structure of the above-mentioned functionalities of an apparatus executing the functions of the network node in the process of FIG. 4 or any one of its embodiments. The apparatus may be a network node for the core network of a cellular communication system, e.g. for a PCF. In another embodiment, the apparatus carrying out the above-described functionalities of the network node is comprised in such an entity, e.g. the apparatus may comprise a circuitry, e.g. a chip, a chipset, a processor, a micro controller, or a combination of such circuitries in the PCF. The apparatus may be an electronic device comprising electronic circuitries for realizing some embodiments of the network node.

Referring to FIG. 7, the apparatus may comprise a communication interface 22 or a communication circuitry configured to provide the apparatus with capability for bidirectional communication with other network nodes such as the access node 104 and the AMF, and also with the terminal device. The communication interface 22 may comprise circuitries for processing messages received from the terminal device and messages transmitted to the terminal device in the above-described embodiments. The communication interface 22 may comprise standard well-known components such as a modem, an amplifier, a filter, a frequency converter, and encoder/decoder circuitries.

The apparatus may further comprise a memory 20 storing one or more computer program products 24 configuring the operation of at least one processor 10 of the apparatus. The memory 20 may further store a configuration database storing operational configurations of the apparatus, e.g. the rule of whether or not including the information on the network slices to which the terminal device has no access permissions in the network slice query response.

Figure 8:
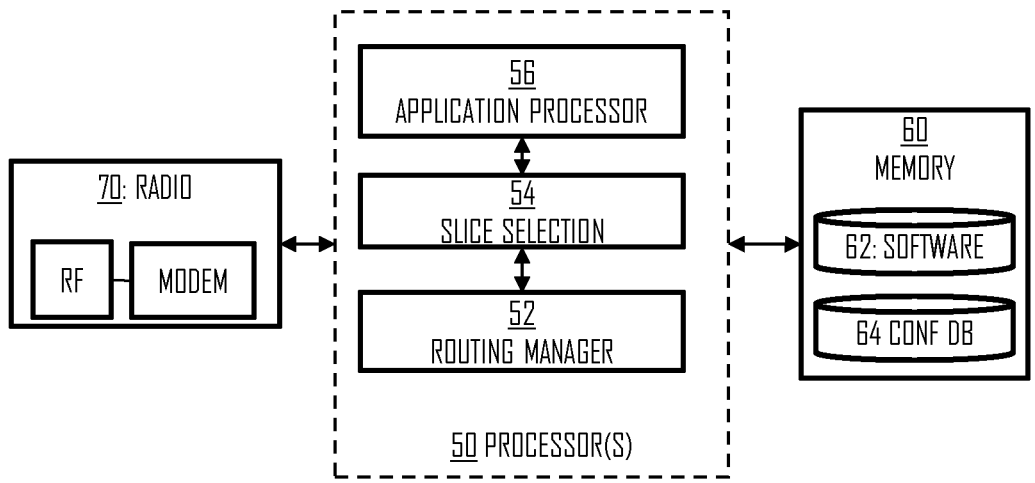

The apparatus may further comprise the at least one processor 10 configured to carry out the process of FIG. 4 or any one of its embodiments. Referring to FIG. 8, the processor(s) 10 may comprise a module 14 executing at least some of the above-described functions of the PCF. The module 14 may comprise the above-described NSSSF module 12 configured to execute the steps of FIG. 4. When executing block 402, the NSSSF may employ a slice information acquisition module 16 configured to retrieve the required information on the network slices from the slice repository 500, if the repository is not stored locally at the memory 20.

FIG. 8 illustrates an embodiment of a structure of the above-mentioned functionalities of the apparatus 100 executing the process of FIG. 3 or any one of the embodiments performed by the terminal device 100. The apparatus may be the terminal device or, in some embodiments, the apparatus may be a circuitry or an electronic device realizing some embodiments of the invention in the terminal device. The apparatus may comply with 3GPP specifications for 5G and/or IEEE 802.11 technology that connects the terminal device to the core network of the cellular communication system via an 802.11 radio interface. The apparatus may be or may be comprised in a computer (PC), a laptop, a tablet computer, a cellular phone, a palm computer, a sensor device, or any other apparatus provided with radio communication capability. In another embodiment, the apparatus carrying out the above-described functionalities is comprised in such a device, e.g. the apparatus may comprise a circuitry such as a chip, a chipset, a processor, a micro controller, or a combination of such circuitries in any one of the above-described devices. The apparatus may be an electronic device comprising electronic circuitries for realizing some embodiments of the present invention.

Referring to FIG. 8, the apparatus may comprise a radio interface providing the apparatus with radio communication capability within a wireless network. The radio interface 70 may comprise a radio modem supporting the 5G specifications and/or IEEE 802.11 technology. The radio interface 70 may further comprise a radio frequency (RF) front end comprising standard well-known components such as an amplifier, filter, frequency-converter, (de)modulator, and encoder/decoder circuitries and one or more antennas.

The apparatus may further comprise a memory 60 storing one or more computer program products 62 configuring the operation of at least one processor of the apparatus. The memory 60 may further store a configuration database 64 storing operational configurations of the apparatus. The configuration database 64 may, for example, store the network slices and corresponding slice identifiers the apparatus is configured to support, routing policies for applications currently transferring data, etc. The configuration database may further store the application requirements of applications executed in the apparatus.

The apparatus may further comprise the at least one processor 50 managing the operation of the apparatus. The at least one processor 50 may comprise an application processor 56 forming an application layer. The application processor may execute computer programs forming the primary function of the apparatus. For example, if the apparatus is a sensor device, the application processor may execute one or more signal processing applications processing measurement data acquired from one or more sensor heads. If the apparatus is a computer system of a vehicle, the application processor may execute a media application and/or an autonomous driving and navigation application. The application processor 56 may generate data to be transmitted over the radio interface and receive data through the radio interface. The application processor may output data transfer requests to a connection manager comprising a slice selection manager 54. The slice selection manager 54 may perform selection of network slices to applications needing data transfer services. The slice selection manager may implement the process of FIG. 3. The apparatus may further comprise a routing manager configured to receive the routing policy in step 510 and to implement data transfer for the application over the selected network slice by using the received routing policy. The routing policy may define, for example, a protocol data unit (PDU) session to be used for the application data, associated traffic and service descriptors, etc.

This definition of 'circuitry' applies to uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention. The processes or methods described in FIGS. 3 to 6 may also be carried out in the form of one or more computer processes defined by one or more computer programs. A separate computer program may be provided in one or more apparatuses that execute functions of the processes described in connection with the Figures. The computer program(s) may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

Embodiments described herein are applicable to wireless networks defined above but also to other access networks including e.g. wireline, or other kinds of wireless networks. The protocols used, the specifications of the wireless networks and their network elements develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. Embodiments are not limited to the examples described above but may vary within the scope of the claims.

The invention claimed is:

1. An apparatus for a terminal device, said apparatus comprising:
   at least one processor; and
   at least one memory including computer program code, the at least one memory and computer program code configured to, with the at least one processor, cause the apparatus to:
   trigger network slice selection in the terminal device for an application executed in the terminal device;
   in response to said triggering, cause transmission of a network slice query request message to a network node of a network infrastructure, wherein the network slice query request message comprises at least one information element specifying at least one criterion comprising at least one of a quality-of-service requirement and charging information;

receive, from the network node as a response to the network slice query request message, a network slice query response message indicating at least one network slice available to the terminal device and comprising at least one quality-of-service parameter of the at least one network slice, wherein the at least one network slice indicated by the network slice query response message meets the at least one criterion of the network slice query request message; and select a network slice of the at least one network slice for the application on the basis of the at least one quality-of-service parameter.

2. The apparatus of claim 1, wherein the at least one memory and computer program code configured to, with the at least one processor, cause the apparatus to perform said selecting by at least transmitting to the network node a request to configure a routing policy for data of the application in the selected network slice.

3. The apparatus of claim 2, wherein the request to configure the routing policy comprises at least one information element indicating an identity of the application.

4. The apparatus of claim 1, wherein the at least one memory and computer program code configured to, with the at least one processor, cause the apparatus to perform said triggering as responsive to the application requesting for data transfer with determined quality-of-service constraints.

5. An apparatus for a network node of a network infrastructure, said apparatus comprising:
at least one processor; and
at least one memory including computer program code, wherein the at least one memory and computer program code configured to, with the at least one processor, cause the apparatus to:
receive a network slice query request message from a terminal device requesting for information on available network slices, wherein the network slice query request message comprises at least one information element specifying at least one criterion comprising at least one of a quality-of-service requirement and charging information;
determine at least one network slice available to the terminal device and meeting the at least one criterion of the network slice query request message;
transmit, to the terminal device as a response to the network slice query request message, a network slice query response message that indicates the at least one network slice available to the terminal device, meeting the at least one criterion of the network slice query request message, and that comprises at least one quality-of-service parameter of the at least one network slice;
receive, from the terminal device, a message indicating a selection of a network slice for an application executed in the terminal device; and
configure a routing policy for data of the application in the selected network slice in the network infrastructure.

6. The apparatus of claim 5, wherein the message indicating the selection of the network slice comprises at least one information element indicating an identity of the application.

7. The apparatus of claim 5, wherein the network slice query request message comprises at least one information element specifying at least one criterion, and wherein the at least one memory and computer program code configured to, with the at least one processor, cause the apparatus to include in the network slice query response message network slices that meet the at least one criterion and exclude from the network slice query response message at least one network slice not meeting the at least one criterion.

8. A method for a terminal device, said method comprising:
triggering, by the terminal device, network slice selection in the terminal device for an application executed in the terminal device;
transmitting, by the terminal device in response to said triggering, a network slice query request message to a network node of a network infrastructure, wherein the network slice query request message comprises at least one information element specifying at least one criterion comprising at least one of a quality-of-service requirement and charging information;
receiving, by the terminal device from the network node as a response to the network slice query request message, a network slice query response message indicating at least one network slice available to the terminal device and comprising at least one quality-of-service parameter of the at least one network slice, wherein the at least one network slice indicated by the network slice query response message meets the at least one criterion of the network slice query request message; and
selecting, by the terminal device, a network slice of the at least one network slice for the application on the basis of the at least one quality-of-service parameter.

9. The method of claim 8, wherein said selecting comprises transmitting to the network node a request to configure a routing policy for data of the application in the selected network slice.

10. The method of claim 9, wherein the request to configure the routing policy comprises at least one information element indicating an identity of the application.

11. A method for a network node of a network infrastructure, said method comprising:
receiving, by the network node, a network slice query request message from a terminal device requesting for information on available network slices, wherein the network slice query request message comprises at least one information element specifying at least one criterion comprising at least one of a quality-of-service requirement and charging information;
determining, by the network node, at least one network slice available to the terminal device and meeting the at least one criterion of the network slice query request message;
transmitting, by the network node to the terminal device as a response to the network slice query request message, a network slice query response message that indicates the at least one network slice available to the terminal device, meeting the at least one criterion of the network slice query request message, and that comprises at least one quality-of-service parameter of the at least one network slice;
receiving, by the network node from the terminal device, a message indicating selection of a network slice for an application executed in the terminal device; and
configuring, by the network node, a routing policy for data of the application in the selected network slice in the network infrastructure.

12. The method of claim 11, wherein the message indicating the selection of the network slice comprises at least one information element indicating an identity of the application.

13. The method of claim 11, further comprising excluding, by the network node, from the network slice query response message at least one network slice not meeting the at least one criterion.

14. A computer program product embodied on a non-transitory computer-readable medium, and comprising a computer program code readable by a computer, wherein the computer program code configures the computer to carry out a computer process for a terminal device, comprising:
- triggering network slice selection in the terminal device for an application executed in the terminal device;
- transmitting, in response to said triggering, a network slice query request message to a network node of a network infrastructure, wherein the network slice query request message comprises at least one information element specifying at least one criterion comprising at least one of a quality-of-service requirement and charging information;
- receiving, from the network node as a response to the network slice query request message, a network slice query response message indicating at least one network slice available to the terminal device and comprising at least one quality-of-service parameter of the at least one network slice, wherein the at least one network slice indicated by the network slice query response message meets the at least one criterion of the network slice query request message; and
- selecting a network slice of the at least one network slice for the application on the basis of the at least one quality-of-service parameter.

15. A computer program product embodied on a non-transitory computer-readable medium, and comprising a computer program code readable by a computer, wherein the computer program code configures the computer to carry out a computer process for a network node of a network infrastructure, comprising:
- receiving a network slice query request message from a terminal device requesting for information on available network slices, wherein the network slice query request message comprises at least one information element specifying at least one criterion comprising at least one of a quality-of-service requirement and charging information;
- determining at least one network slice available to the terminal device and meeting the at least one criterion of the network slice query request message;
- transmitting, to the terminal device as a response to the network slice query request message, a network slice query response message that indicates the at least one network slice available to the terminal device, meeting the at least one criterion of the network slice query request message, and that comprises at least one quality-of-service parameter of the at least one network slice;
- receiving, from the terminal device, a message indicating selection of a network slice for an application executed in the terminal device; and
- configuring, by the network node, a routing policy for data of the application in the selected network slice in the network infrastructure.

16. A computer program product embodied on a non-transitory computer-readable medium, and comprising a computer program code readable by a computer, wherein the computer program code configures the computer to carry out a computer process comprising the method according to claim 9.

17. A system comprising:
- a first apparatus for a terminal device, comprising at least one processor and at least one memory including computer program code, the at least one memory and computer program code configured to, with the at least one processor, cause the first apparatus to: trigger network slice selection in the terminal device for an application executed in the terminal device; in response to said triggering, cause transmission of a network slice query request message to a network node of a network infrastructure, wherein the network slice query request message comprises at least one information element specifying at least one criterion comprising at least one of a quality-of-service requirement and charging information; receive, from the network node as a response to the network slice query request message, a network slice query response message indicating at least one network slice available to the terminal device and comprising at least one quality-of-service parameter of the at least one network slice, wherein the at least one network slice indicated by the network slice query response message meets the at least one criterion of the network slice query request message; and select a network slice of the at least one network slice for the application on the basis of the at least one quality-of-service parameter; and
- a second apparatus for the network node, comprising at least one processor and at least one memory including computer program code, wherein the at least one memory and computer program code configured to, with the at least one processor, cause the second apparatus to: receive the network slice query request message from the terminal device requesting for information on available network slices, wherein the network slice query request message comprises at least one information element specifying at least one criterion comprising at least one of a quality-of-service requirement and charging information; determine at least one network slice available to the terminal device and meeting the at least one criterion of the network slice query request message; transmit, to the terminal device as a response to the network slice query request message, the network slice query response message that indicates the at least one network slice available to the terminal device, meeting the at least one criterion of the network slice query request message, and that comprises at least one quality-of-service parameter of the at least one network slice; receive, from the terminal device, a message indicating a selection of the network slice for the application executed in the terminal device; and configure a routing policy for data of the application in the selected network slice in the network infrastructure.

* * * * *